United States Patent

Heiskari et al.

[19]

[11] Patent Number: 5,903,847
[45] Date of Patent: May 11, 1999

[54] METHOD FOR CONTROLLING A RADIO UNIT

[75] Inventors: Mika Heiskari, Espoo; Mika Lehmusto, Kerava, both of Finland

[73] Assignee: Nokia Telecommunications Oy, Espoo, Finland

[21] Appl. No.: 08/637,672

[22] PCT Filed: Nov. 29, 1994

[86] PCT No.: PCT/FI94/00533

§ 371 Date: May 2, 1996

§ 102(e) Date: May 2, 1996

[87] PCT Pub. No.: WO95/15623

PCT Pub. Date: Jun. 8, 1995

[30] Foreign Application Priority Data

Nov. 30, 1993 [FI] Finland .................................... 935363

[51] Int. Cl.⁶ .................................................. H04B 7/26
[52] U.S. Cl. ........................................ 455/509; 455/517
[58] Field of Search ..................... 455/410, 411, 455/422, 450, 452, 455, 507, 509, 510, 515, 516, 517, 518, 526–528, 67.1, 68, 88, 550, 575

[56] References Cited

U.S. PATENT DOCUMENTS

| | | |
|---|---|---|
| 4,716,407 | 12/1987 | Borras et al. . |
| 5,423,055 | 6/1995 | Diaz et al. ............................. 455/519 |
| 5,511,232 | 4/1996 | O'Dea et al. ........................... 455/519 |
| 5,515,366 | 5/1996 | Chieu et al. ........................... 455/455 |
| 5,666,661 | 9/1997 | Grube et al. ........................... 455/509 |

OTHER PUBLICATIONS

Patent Abstracts of Japan, vol. 15, No. 195, E–1069, Abstract of JP, A 3–50996 (Iwatsu Electric Co. Ltd.) Mar. 5, 1991.

*Primary Examiner*—Thanh Cong Le
*Attorney, Agent, or Firm*—Pillsbury Madison & Sutro LLP

[57] ABSTRACT

A method for controlling a radio unit in a radio system which has at least a first radio unit and a second radio unit in which at least one of the radio units communicates on a direct mode channel. In order either to stop the entire operation of the second radio unit or to stop it from operating on the direct mode channel, the first radio unit transmits a direct mode channel leaving request message to the second radio unit on the direct mode channel, this message commanding the second radio unit to cease from communicating on one or more direct mode channels.

15 Claims, 1 Drawing Sheet

|  DEACTIVATING  |  UNIT TO BE  |
|  UNIT  |  DEACTIVATED  |

| 201 | 202 | 203 | 204 |
|---|---|---|---|
| MESSAGE IDENTIFIER | DESIRED GROUP | UNDESIRED GROUP | PRIORITY |

METHOD FOR CONTROLLING A RADIO UNIT

This application claims benefit of international application PCT/Fl94/00533 filed Nov. 29, 1994.

BACKGROUND OF THE INVENTION

The invention relates to a method for controlling a radio unit in a radio system comprising at least a first radio unit and a second radio unit, in which method at least one of the radio units communicates on a direct mode channel.

The invention relates to the field of mobile telephone systems. A subscriber in a mobile telephone system, i.e. a subscriber station, such as a radio telephone or other mobile unit, may be connected to a radio network or radio system via system and traffic channels maintained by base stations of the radio network.

In addition to system channels provided by mobile telephone networks, the radio system may employ what are known as direct mode channels. In other words, the communication mode is direct. When operating in direct mode, the subscriber stations do not communicate directly with the radio network or its base stations. Direct mode channels are frequencies at which radio telephones or other mobile stations can communicate independently of the system directly with one another.

Direct mode channels are typically employed in situations where, for example, a number of hand-held mobile telephones communicate with one another at such a distance from a base station that system channels cannot be used.

Another important utility for direct mode channels consists in increasing system capacity when the traffic load on the system increases rapidly in some part, for instance a spotlike part, of the system coverage area.

The term direct or simplex channel or simplex connection is used for a direct mode channel. A direct mode channel is a channel that is typically not available to the system. It is not a frequency pair, but a single channel having the breadth of one of the system channels, e.g. 12.5 kHz or 25 kHz. Of the radio telephones operating on a direct mode channel, the sender has tuned his or her transmitter to a channel and transmits speech or data information. The other radio telephones set in a mode of using direct mode channels have tuned their receivers to the same channel and thus hear the transmission directly.

On a direct mode channel, it is possible to operate by analog modulation or digital modulation. A radio telephone transmitting on the channel may also transmit signalling information, such as information on user access rights and priorities or on a given group communicating on the channel. Encryption may be employed on the direct mode channel or plain speech may be transmitted.

Subscriber stations, i.e. radio units, operating in the direct mode, i.e. on a direct mode channel, communicate with other subscriber stations on a direct mode channel without being in direct communication with base stations of the radio network. However, subscriber stations in the direct mode can communicate with the radio network via repeater stations.

Prior art solutions typically operate in such a manner that the system does not check the access rights of radio units communicating on a direct mode channel, since typically subscriber stations communicating on a direct mode channel do not communicate with the mobile telephone system and its subscriber authentication units. Thus, in the prior art systems, radio units unauthorized to communicate in the mobile telephone system can communicate on direct mode channels alongside the authorized radio units. Such unauthorized radio units may be, for example, stolen mobiles or units prohibited from use for some other reason, for instance on account of the fact that the holder of the radio telephone has not paid his her or its bill to the telephone company.

Thus the problem with the prior art solutions is that subscriber stations, i.e. radio units, not authorized to communicate in the system can nevertheless communicate on a direct mode channel.

SUMMARY OF THE INVENTION

It is an object of the present invention to provide a method for controlling a radio unit, enabling the problem associated with the prior art to be avoided by operating in accordance with the method, in other words, enabling removal of unauthorized radio units communicating on a direct mode channel.

This novel method for controlling a radio unit is achieved with the method of the invention, being characterized in that the first radio unit transmits a direct mode channel leaving request message to the second radio unit on the direct mode channel, this message commanding the second radio unit to cease from communicating on one or more direct mode channels.

The invention is based on the idea that a message, i.e. a direct mode channel leaving request message, is transmitted on the direct mode channel to a second radio unit if the second radio unit is assumed to be unauthorized for communication on the direct mode channel. This message commands the second radio unit to cease from communicating on the direct mode channel or to cease its operation entirely. Said leaving of the direct mode channel may be made conditional in such a way that the second radio unit requests a given operation, such as sending of a message, from the radio unit that transmitted the direct mode channel leaving request message. That message may include a suitable identifier authorizing the radio unit that transmitted the direct mode channel leaving request message to command the second radio unit to cease communication.

It is an advantage of such a method for controlling a radio unit that it resolves the problem of the prior art. The method of the invention will remove unauthorized radio units, or desired radio units, from a direct mode channel. By means of the invention, radio units not belonging to the system or unauthorized radio units can be prevented from communicating, from tapping into radio channels, and from fraudulent access to a direct mode channel.

Another advantage of the invention is that it gives the second radio unit the possibility to check the validity of the direct mode channel leaving request message it has received and the right of the radio unit or entity that transmitted the message to send such a message.

A further advantage of the invention is that a system, such as a radio unit, a base transceiver station or a switching center, operating in accordance with the invention may either exclude the unauthorized radio unit from direct mode operation or silence the unauthorized radio unit entirely.

BRIEF DESCRIPTION OF THE DRAWING

In the following the invention will be explained in greater detail with reference to the accompanying drawings, in which.

DETAILED DESCRIPTION

Figures 1, 2:
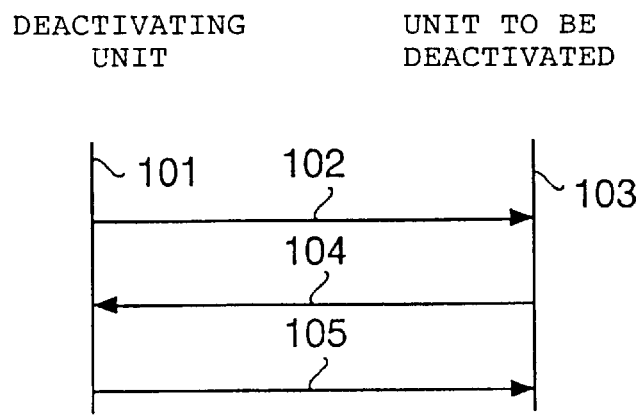
FIG. 1 is a message flowsheet of the implementation of a method according to the invention.
FIG. 2 is a schematic view of a direct mode channel leaving request message according to the invention.

FIG. 1 is a message flowsheet of the implementation of a method according to the invention. In the figure, a deactivating unit 101, for example a radio unit communicating on a direct mode channel or a base station of a mobile telephone system or a repeater station, sends on the direct mode channel a direct mode channel leaving request message 102, an example of which is illustrated in FIG. 2, to a radio telephone 103 to be removed from the direct mode channel.

If one operates in accordance with a first embodiment of the invention, after having received the direct mode channel leaving request 102 the deactivated radio unit 103, for example a radio telephone, ceases from communicating on the direct mode channel or, in one variant of the invention, ceases its operation entirely.

In a second embodiment of the invention, after having received the direct mode channel leaving request 102 the radio unit to be deactivated sends a challenge message 104 to the deactivating unit 101. By means of the challenge message 104, the unit to be deactivated requests the deactivating unit, or the system behind it, to perform a given operation, for example to send a message of a predetermined content, to the unit 103 to be deactivated. Thereafter, if the deactivating unit performs the operation requested in the challenge message 104, the deactivated unit 103 ceases from communicating on the direct mode channel or ceases all communication or operation. On the other hand, if the deactivating unit 101 does not perform the operation requested in the challenge message, the unit 103 to be deactivated continues to operate in the normal way.

The above-stated operation, which the unit 103 to be deactivated requests to be performed by sending the challenge message 104, may be, for instance, sending of a message of a predetermined content, such as a response message 105, to the radio unit 103 to be deactivated. In the challenge message, the radio unit 103 to be deactivated may send to the deactivating unit 101—such as a base station of a mobile telephone system, a repeater station or another radio unit - a series of digits, for example, or any other identifier to which the deactivating unit 101 must be able to respond in the manner the radio unit 103 to be deactivated requires. It is to be noted that on a direct mode channel, the unit deactivating another radio unit may also be a radio unit. Nevertheless, whatever the deactivating unit, it must be (or its user must be) authorized to command other radio units to cease from communicating on the direct mode channel or to cease their operation entirely. To ensure this, it is necessary to send the challenge message and the response message generated in response to the challenge message and to analyze the content of these messages, as explained above.

FIG. 2 is a schematic view of a direct mode channel leaving request message according to the invention. In field 201, the message includes a message identifier indicating that a direct mode channel leaving request message is involved. Field 202 indicates the group authorized to communicate on the direct mode channel. If a user group is indicated in this field 202, radio units not belonging to this group and yet listening on the direct mode channel observe the direct mode channel leaving request message and cease from communicating on the direct mode channel or cease their operation entirely, as shown in FIG. 1. Field 202 may indicate specifically the radio units authorized to communicate on the direct mode channel. It is to be noted that even though in accordance with the above a group identifier is indicated in the above-mentioned fields, the identifier in the field may equally well refer to an individual subscriber.

In FIG. 2, field 204 indicates a priority for the direct mode channel leaving request. The higher the priority, the greater the probability that the unit to be deactivated actually leaves the direct mode channel or ceases from operating entirely. This field 204 may be employed for carrying out conditional channel clearing. A high priority will command a mobile unit to unconditionally leave the direct mode channel or to cease its operation, and in the case of a low priority the radio unit will leave the direct mode channel on certain conditions.

It is to be noted that leaving the direct mode channel and ceasing from communication entirely in accordance with the above may be temporary or permanent.

The drawings and the description pertaining thereto are only intended to illustrate the idea of the invention. The method of the invention for controlling a radio unit may vary in its details within the scope of the claims. Even though the invention has been explained in the above mainly in the context of mobile telephone systems, the invention can be employed in other types of telecommunications systems as well.

We claim:

1. A method for controlling a direct mode radio unit on at least one separate and independent direct mode channel, which includes a first radio unit and a second radio unit, the method comprising:

said second radio communicating on said at least one separate and independent direct mode channel;

said first radio unit transmitting a direct mode channel leaving request message to said second radio unit on said separate and independent direct mode channel, said channel leaving request message commanding said second radio unit to cease from communicating on one or more direct mode channels including said separate and independent direct mode channel, said direct mode channel leaving request message including an identifier corresponding to said second radio unit or corresponding to a group of radio units including said second radio unit that is desired to cease communicating on said one or more direct mode channels.

2. The method as claimed in claim 1, further comprising:

said second radio unit receiving said direct mode channel leaving request message; and in response to receiving said message said second radio unit ceasing from communicating on said one or more direct mode channels including said separate and independent direct mode channel.

3. The method as claimed in claim 2, wherein:

said direct mode channel leaving request message includes an identifier of said second radio unit or of a group of radio units including said second radio unit that is authorized to communicate on said one or more direct mode channels.

4. The method as claimed in claim 1 further comprising:

said second radio unit receiving said direct mode channel leaving request message; and in response to receiving said message, said second radio unit ceasing operation.

5. The method as claimed in claim 4, wherein:

said ceasing is permanent.

6. The method as claimed in claim 4 wherein:

said ceasing is temporary.

7. The method as claimed in claim 1, further comprising:

said second radio unit receiving said direct mode channel leaving request message;

said second radio unit, as a result of said receiving, sending to said first radio unit a challenge message by which said second radio unit requests said first radio unit to perform a given operation;

said first radio unit receiving said challenge message; and if said first radio unit as a result of receiving said challenge message performs the operation requested in said challenge message, said second radio unit ceasing from communicating on said separate and independent direct mode channel.

8. The method as claimed in claim 7, wherein:

the operation requested in said challenge message is sending by said first radio unit of a response message to said second radio unit.

9. The method as claimed in claim 8, wherein:

in response to said challenge message sent by said second radio unit, said first radio unit sending said response message to said second radio unit;

said second radio unit receiving said response message;

said second radio unit analyzing said response message; and if a content of said response message is consistent with predetermined criteria, said second radio unit ceasing from communicating on said direct mode channel.

10. The method as claimed in claim 8, wherein:

in response to said challenge message sent by said second radio unit, said first radio unit sending said response message to said second radio unit:

said second ratio unit receiving said response message;

said second radio unit analyzing said response message; and if a content of said response message is not consistent with predetermined criteria, said second radio unit not ceasing from communicating on said direct mode channel.

11. The method as claimed in claim 8, wherein:

in response to said challenge message sent by said second radio unit, said first radio unit sending said response message to said second radio unit;

said second radio unit receiving said response message;

said second radio unit analyzing said response message; and if the content of said response message is consistent with predetermined criteria, said second radio unit ceasing operation.

12. The method as claimed in claim 8, wherein:

in response to said challenge message sent by said second radio unit, said first radio unit sending said response message to said second radio unit;

said second radio unit receiving said response message;

said second radio unit analyzing said response message; and if a content of said response message is not consistent with predetermined criteria, said second radio unit not ceasing operation.

13. The method as claimed in claim 1, further comprising:

said second radio unit receiving said direct mode channel leaving request message;

said second radio unit, as a result of said receiving, sending to said first radio unit a challenge message by which said second radio unit requests said first radio unit to perform a given operation;

said first radio unit receiving said challenge message; and if said first radio unit does not after receiving said challenge message perform the operation requested in said challenge message, said second radio unit continuing communicating on said one or more direct mode channels, including said separate and independent direct mode channel.

14. The method as claimed in claim 1, further comprising:

said second radio unit receiving said direct mode channel leaving request message;

said second radio unit, as a result of said receiving, sending to said first radio unit a challenge message by which said second radio unit requests said first radio unit to perform a given operation;

said first radio unit receiving said challenge message; and if said first radio unit after receiving said challenge message performs the operation requested in said challenge message, said second radio unit ceasing operation.

15. The method as claimed in claim 1, further comprising:

said second radio unit receiving said direct mode channel leaving request message;

said second radio unit, as a result of said receiving, sending to said first radio unit a challenge message by which said second radio unit requests said first radio unit to perform a given operation;

said first radio unit receiving said challenge message; and if said first radio unit does not after receiving said challenge message perform the operation requested in said challenge message, said second radio unit continuing in operation.

* * * * *